(12) United States Patent
Mizuochi

(10) Patent No.: US 9,423,486 B2
(45) Date of Patent: Aug. 23, 2016

(54) POSITION CALCULATING METHOD AND POSITION CALCULATING DEVICE

(75) Inventor: Shunichi Mizuochi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 14/008,527

(22) PCT Filed: Mar. 12, 2012

(86) PCT No.: PCT/JP2012/001693
§ 371 (c)(1),
(2), (4) Date: Dec. 4, 2013

(87) PCT Pub. No.: WO2012/137415
PCT Pub. Date: Oct. 11, 2012

(65) Prior Publication Data
US 2014/0106775 A1    Apr. 17, 2014

(30) Foreign Application Priority Data
Apr. 1, 2011    (JP) .................................. 2011-081657

(51) Int. Cl.
*H01S 5/00* (2006.01)
*G01S 5/00* (2006.01)
*G01S 19/47* (2010.01)
*G01C 21/16* (2006.01)

(52) U.S. Cl.
CPC .............. *G01S 5/0027* (2013.01); *G01C 21/165* (2013.01); *G01S 19/47* (2013.01)

(58) Field of Classification Search
CPC ........... G01S 19/47; G01S 19/49; G01S 5/00; G01S 5/0027; G01S 19/00; G01S 19/01; G01S 19/06; G01S 19/07; G01C 21/165; H04W 4/02; H04W 4/04; H04W 4/023; H04W 4/027; H04W 4/046
See application file for complete search history.

(56) References Cited

U.S. PATENT DOCUMENTS

| 5,394,333 | A  * | 2/1995 | Kao ........................ | G01C 21/30 340/990 |
| 2008/0091351 | A1 * | 4/2008 | Hoshizaki ............... | G01S 19/47 701/478.5 |
| 2009/0009387 | A1 * | 1/2009 | Malaney .................. | G01S 19/34 342/357.74 |

(Continued)

FOREIGN PATENT DOCUMENTS

| JP | 10-141967 A | 5/1998 |
| JP | 2003-207351 A | 7/2003 |

(Continued)

OTHER PUBLICATIONS

Schmidt et al.—INS/GPS Integration Architectures—Mar. 2010.*

(Continued)

*Primary Examiner* — Meless Zewdu
(74) *Attorney, Agent, or Firm* — Kilpatrick Townsend & Stockton LLP

(57) ABSTRACT

In a position calculating device of a moving object including a satellite positioning unit and an inertial positioning unit, a position calculation accuracy determining unit determines a position calculation accuracy and sets an influence level of measurement result 1 of the satellite positioning unit on measurement result 2 of the inertial positioning unit on the basis of the determined position calculation accuracy. The position of the moving object is calculated by performing a coupling process of coupling measurement result 1 and measurement result 2 on the basis of the set influence level.

8 Claims, 12 Drawing Sheets

(56) References Cited

U.S. PATENT DOCUMENTS

| | | | |
|---|---|---|---|
| 2009/0096670 A1* | 4/2009 | Mizuochi | G01S 19/40 342/357.23 |
| 2009/0099773 A1* | 4/2009 | Watanabe | G01S 19/42 701/472 |
| 2010/0019963 A1 | 1/2010 | Gao et al. | |
| 2010/0188284 A1* | 7/2010 | Anand | G01S 19/47 342/357.25 |
| 2010/0265134 A1* | 10/2010 | Yoshioka | G01S 19/42 342/357.69 |
| 2010/0318292 A1* | 12/2010 | Kulik | G01C 21/165 701/414 |

FOREIGN PATENT DOCUMENTS

| | | |
|---|---|---|
| JP | 2008-275530 A | 11/2008 |
| JP | 2010-530958 A | 9/2010 |
| WO | 2008/143497 A1 | 11/2008 |

OTHER PUBLICATIONS

Schmidt, George T. et al., INS/GPS Integration Architectures, RTO-EN-SET-116(2010), pp. 5-1-5-18.

* cited by examiner

| CONTROL INPUT U | OBSERVABLE Z | STATE X |
|---|---|---|
| INS OPERATION RESULT (SUCH AS POSITION, VELOCITY, AND POSTURE ANGLE) | GPS OPERATION RESULT (SUCH AS POSITION AND VELOCITY) | MOVING OBJECT INFORMATION (SUCH AS POSITION, VELOCITY, AND POSTURE ANGLE) |
| INS OPERATION RESULT (SUCH AS POSITION, VELOCITY, AND POSTURE ANGLE) | GPS MEASUREMENT INFORMATION (SUCH AS CODE PHASE, DOPPLER FREQUENCY, PSEUDO-DISTANCE, AND PSEUDO-DISTANCE VARIATION) | MOVING OBJECT INFORMATION (SUCH AS POSITION, VELOCITY, AND POSTURE ANGLE) |
| INS MEASUREMENT INFORMATION (SUCH AS ACCELERATION AND ANGULAR VELOCITY) | GPS MEASUREMENT INFORMATION (SUCH AS CODE PHASE, DOPPLER FREQUENCY, PSEUDO-DISTANCE, AND PSEUDO-DISTANCE VARIATION) | MOVING OBJECT INFORMATION (SUCH AS POSITION, VELOCITY, AND POSTURE ANGLE) |
| . . . | . . . | . . . |

FIG. 3

| GPS INFLUENCE MODE (521) | OPERATION SETTING (523) | |
|---|---|---|
| | GPS MEASUREMENT RESULT UTILIZATION FREQUENCY | OBSERVATION ERROR (R VALUE) OF KALMAN FILTERING PROCESS |
| FIRST INFLUENCE MODE | NOT UTILIZED | — |
| SECOND INFLUENCE MODE | ONCE OF TEN TIMES | POSITION OBSERVATION ERROR $R_P = 500$<br>VELOCITY OBSERVATION ERROR $R_V = 50$ |
| THIRD INFLUENCE MODE | ONCE OF FIVE TIMES | POSITION OBSERVATION ERROR $R_P = 100$<br>VELOCITY OBSERVATION ERROR $R_V = 10$ |
| FOURTH INFLUENCE MODE | EVERY TIME | POSITION OBSERVATION ERROR $R_P = (\sigma_P)^2$<br>VELOCITY OBSERVATION ERROR $R_V = (\sigma_V)^2$ |

LOW IN INFLUENCE LEVEL ←→ HIGH IN INFLUENCE LEVEL

FIG. 10

POSITION CALCULATING METHOD AND POSITION CALCULATING DEVICE

This application is a National Phase of International Application No. PCT/JP2012/001693, filed Mar. 12, 2012, which claims priority to Japanese Patent Application No. 2011-081657, filed Apr. 1, 2011, the entireties of which are hereby incorporated by reference.

BACKGROUND

1. Technical Field

The present invention relates to a position calculating method and the like using measurement results of a satellite positioning unit and an inertial positioning unit which are disposed in a moving object.

2. Related Background Art

In various fields related to so-called seamless positioning, motion sensing, and posture control, use of an inertial sensor has attracted attention. An acceleration sensor, a gyro sensor, a pressure sensor, a geomagnetic sensor, and the like are widely used as the inertial sensor. An inertial navigation system (hereinafter, referred to as "INS") which performs position calculation by an inertial navigation operation using detection results of the inertial sensor has also been practically used.

In the INS, there is a problem in that the position calculation accuracy is lowered due to various error components which can be included in the detection results of an inertial sensor, and various techniques for improving the position calculation accuracy have been invented. For example, US2010/0019963 discloses a technique of correcting an INS operation result using a GPS (Global Positioning System).

SUMMARY

The technique of correcting the INS operation result using the GPS is based on the premise that the GPS operation result is correct. The same is true of the technique disclosed in US2010/0019963. However, the operation result accuracy of the GPS operation result may be lowered due to various factors such as signal intensities and reception environments of GPS satellite signals received from GPS satellite, arrangement of GPS satellites in the sky, and multipath. Accordingly, the correction of the INS operation result using the GPS operation result does not necessarily improve the position calculation accuracy.

The invention is made in consideration of the above-mentioned circumstances and an object thereof is to provide a technique of more accurately calculating a position of a moving object using measurement results of a satellite positioning unit and an inertial positioning unit which are disposed in the moving object together.

According to a first aspect of the invention for achieving the above-mentioned object, there is provided a position calculating method of calculating a position of a moving object using a first measurement result of a satellite positioning unit disposed in the moving object and a second measurement result of an inertial positioning unit disposed in the moving object, including: determining position calculation accuracy; setting an influence level of the first measurement result on the second measurement result on the basis of the position calculation accuracy; and calculating the position of the moving object by performing a coupling process of coupling the first measurement result and the second measurement result on the basis of the influence level.

According to another aspect of the invention, there is provided a position calculating device calculating a position of a moving object using a first measurement result of a satellite positioning unit disposed in the moving object and a second measurement result of an inertial positioning unit disposed in the moving object, including: a position calculation accuracy determining unit that determines a position calculation accuracy; an influence level setting unit that sets an influence level of the first measurement result on the second measurement result on the basis of the position calculation accuracy; and a coupling unit that calculates the position of the moving object by performing a coupling process of coupling the first measurement result and the second measurement result on the basis of the influence level.

According to the first aspect and the like of the invention, the position calculation accuracy is determined. The influence level of the measurement result (first measurement result) of the satellite positioning unit on the measurement result (second measurement result) of the inertial positioning unit is set on the basis of the position calculation accuracy. Accordingly, it is possible to realize appropriate adjustment of the influence level particularly in continuous movement. It is also possible to improve the accuracy of position calculation by performing the coupling process of coupling the first measurement result and the second measurement result on the basis of the appropriately-adjusted influence level.

As a second aspect of the invention, the position calculating method according to the first aspect may be configured such that the determining of the position calculation accuracy includes determining the position calculation accuracy on the basis of an elapsed time or a position calculation frequency after the moving object starts to move.

According to the second aspect, it is possible to simply and appropriately determine the position calculation accuracy on the basis of the elapsed time or the position calculation frequency after the moving object starts to move.

As a third aspect of the invention, the position calculating method according to the first or second aspect may be configured such that the coupling process includes an error estimating operation of estimating an error included in the calculated position, and the determining of the position calculation accuracy may include determining the position calculation accuracy on the basis of the error estimated through the error estimating operation.

According to the third aspect, it is possible to simply and appropriately determine the position calculation accuracy on the basis of the error of the position estimated by performing the error estimating operation in the coupling process.

As a fourth aspect of the invention, the position calculating method according to any one of the first to third aspects may be configured such that the influence level includes a frequency of performing the coupling process using the first measurement result, the setting of the influence level includes setting the frequency on the basis of the position calculation accuracy, and the calculating of the position includes performing the coupling process using the first measurement result on the basis of the frequency.

According to the fourth aspect, it is possible to appropriately adjust the frequency of performing the coupling process using the first measurement result and to improve effectiveness of the coupling process, on the basis of the position calculation accuracy.

As a fifth aspect of the invention, the position calculating method according to the fourth aspect may be configured such that the setting of the frequency includes setting the frequency to be lower with the higher position calculation accuracy.

According to the fifth aspect, it is possible to reduce dependency on the satellite positioning unit by setting the frequency of performing the coupling process using the first measurement result to be lower with the higher position calculation accuracy. When the position calculation accuracy is high, the accuracy of position calculation is guaranteed even by lowering the influence level of the first measurement result and performing the coupling process.

As a sixth aspect of the invention, the position calculating method according to any one of the first to third aspects may be configured such that the coupling process includes a Kalman filtering process using the first measurement result as an observable, the setting of the influence level includes setting an error parameter value to be used in the Kalman filtering process on the basis of the position calculation accuracy, and the calculating of the position includes performing the Kalman filtering process using the first measurement result and the error parameter value.

The error parameter value is, for example, a value for determining the level at which the first measurement result is emphasized in the Kalman filtering process. According to the sixth aspect, it is possible to appropriately adjust the error parameter value and to more accurately calculate the position of the moving object, by setting the error parameter value on the basis of the position calculation accuracy.

As a seventh aspect of the invention, the position calculating method according to the sixth aspect may be configured such that the setting of the error parameter value includes setting the error parameter value to be larger with the higher position calculation accuracy.

According to the seventh aspect, it is possible to reduce dependency on the satellite positioning unit by setting the error parameter value used in the Kalman filtering process to be larger with the higher position calculation accuracy. When the position calculation accuracy is high, the accuracy of position calculation is guaranteed even by lowering the influence level of the first measurement result and performing the coupling process.

BRIEF DESCRIPTION OF THE DRAWINGS

FIG. 3 is a diagram illustrating input and output data in a coupling process.

FIG. 10 is a diagram illustrating an example of a table configuration of an operation setting table.

DESCRIPTION OF EXEMPLARY EMBODIMENTS

Hereinafter, an example of an exemplary embodiment of the invention will be described with reference to the accompanying drawings. In this embodiment, position calculation is performed using a GPS (Global Positioning System) which is a kind of a satellite positioning system and an INS (Inertial Navigation System) which is a system for performing an inertial navigation operation together.

1. Principle 1.1. System Configuration

Figure 1:
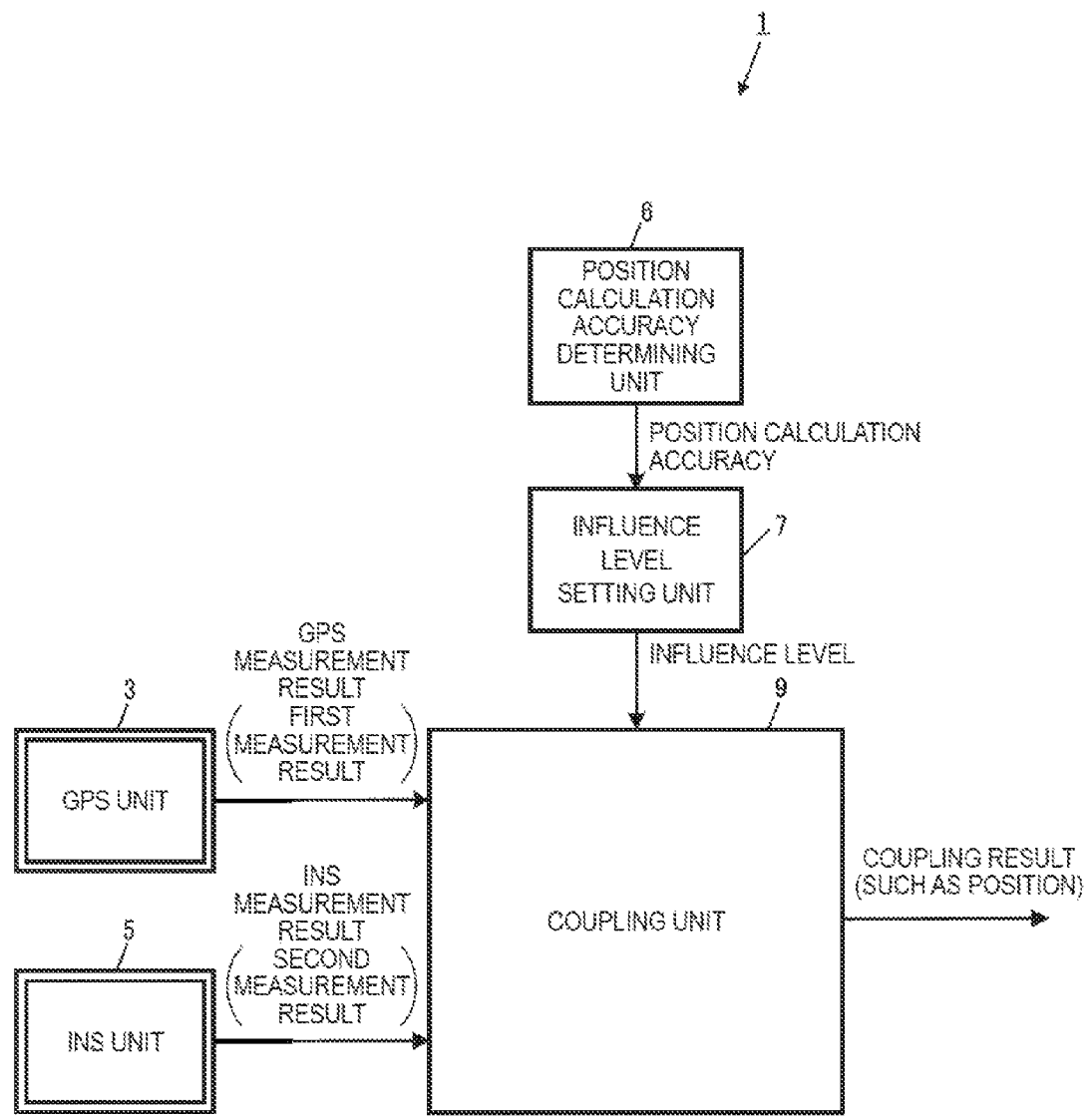
FIG. 1 is a diagram illustrating a principal configuration of a position calculating device.

FIG. 1 is a diagram illustrating a principal configuration of a position calculating device 1 according to this embodiment. The position calculating device 1 is a device (position calculating system) which is disposed in a moving object so as to calculate the position of the moving object. Examples of the moving object include a person in addition to an automobile, a motorcycle, a bicycle, a ship, and a train. A person may carry the position calculating device 1 as if the person themself had the position calculating device 1 installed. In FIG. 1, a unit (module) is indicated by a double line and a processing block performing an operation process using the measurement result of the unit is indicated by a single line, so as to distinguish both from each other. The same is true of FIG. 2.

The position calculating device 1 includes a GPS unit 3 and an INS unit 5 as units (modules). The position calculating device 1 includes a position calculation accuracy determining unit 6, an influence level setting unit 7, and a coupling unit 9 as principal processing blocks.

The GPS unit 3 is a unit (satellite positioning unit) that performs a positioning operation using a satellite position system. The GPS unit 3 includes an antenna receiving GPS satellite signals transmitted from GPS satellites, a processor processing the received GPS satellite signals, and the like.

The GPS unit 3 is configured to measure GPS measurement information such as code phases or Doppler frequencies of the GPS satellite signals, a pseudo-distance, and a pseudo-distance variation. The GPS unit 3 is also configured to perform a GPS operation using the GPS measurement information and to measure the position, the velocity (velocity vector) or the like of a moving object. The GPS measurement information or the GPS operation result is output as a GPS measurement result (first measurement result) to the coupling unit 9.

The INS unit 5 is a unit (inertial positioning unit) that performs a positioning operation using an inertial navigation. The INS unit 5 includes an inertial sensor such as an acceleration sensor or a gyro sensor, an inertial measurement unit (IMU) obtained by packaging the inertial sensor, and a processor processing the measurement result of the inertial sensor.

The INS unit 5 is configured to measure an acceleration (acceleration vector), an angular velocity or the like of a moving object as INS measurement information using the measurement result of the inertial sensor. The INS unit 5 is configured to perform an inertial navigation operation (INS operation) using the INS measurement information and to measure the position, the velocity (velocity vector), the posture angle, and the like of the moving object. The INS measurement information or the INS operation result is output as an INS measurement result (second measurement result) to the coupling unit 9.

The position calculation accuracy determining unit 6 determines position calculation accuracy which is a probability of position calculation. Specifically, the position calculation accuracy determining unit 6 determines the position calculation accuracy on the basis of an elapsed time or a position calculation frequency after the moving object starts to move. The position calculation accuracy determining unit 6 determines the position calculation accuracy on the basis of an estimated coupling error estimated by causing the coupling unit 9 to perform a predetermined error estimating operation in the coupling process.

The influence level setting unit 7 sets an influence level of the GPS measurement result (first measurement result) on the INS measurement result (second measurement result) on the basis of the position calculation accuracy determined by the position calculation accuracy determining unit 6.

The coupling unit 9 calculates the position of a moving object or the like by performing a coupling process of coupling the GPS measurement result (first measurement result) and the INS measurement result (second measurement result) on the basis of the influence level set by the influence level setting unit 7.

Figure 2:
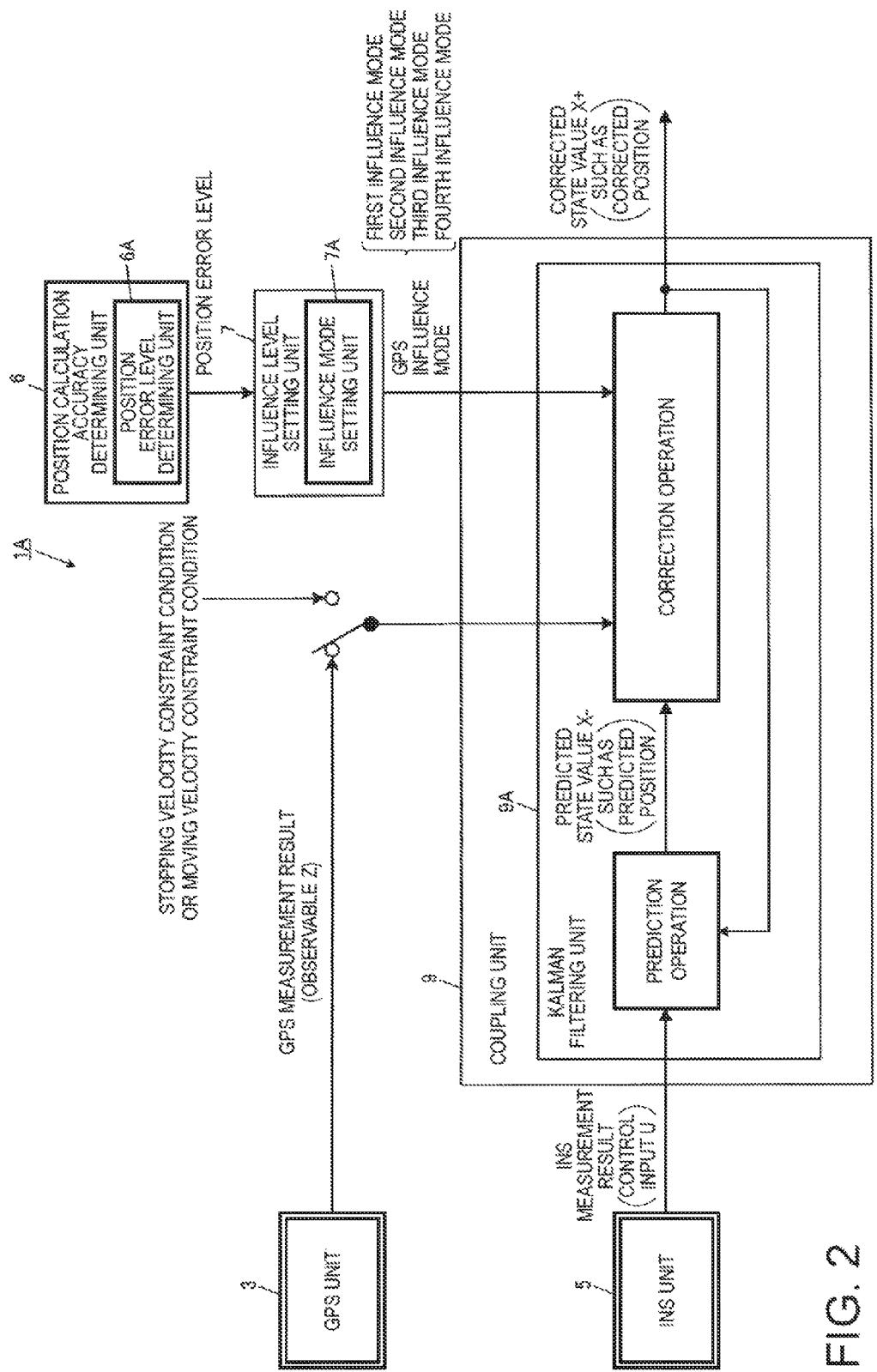
FIG. 2 is a diagram illustrating a configuration of a first position calculating device.

FIG. 2 is a diagram illustrating the configuration of a first position calculating device 1A employing the position calculating device 1 shown in FIG. 1. In the first position calculating device 1A, the position calculation accuracy determining unit 6 shown in FIG. 1 includes a position error level determining unit 6A, and the influence level setting unit 7 includes an influence mode setting unit 7A. The coupling unit 9 shown in FIG. 1 includes a Kalman filtering unit 9A.

The position error level determining unit 6A determines a position error level in accordance with a mode setting condition (first or second mode setting condition) to be described later. The position error level is a level of a position error for determining the position calculation accuracy.

The influence mode setting unit 7A sets a GPS influence mode on the basis of the position error level determined by the position error level determining unit 6A. The GPS influence mode is a mode in which the influence level of the GPS is determined. In this embodiment, it is assumed that four types of modes of a "first influence mode", a "second influence mode", a "third influence mode", and a "fourth influence mode" are alternatively selected and set in the order in which the influence level of the GPS measurement result on the INS measurement result decreases.

The Kalman filtering unit 9A performs a Kalman filtering process using the GPS measurement result as an observable "Z" to couple the GPS measurement result and the INS measurement result. Specifically, a prediction operation (time update) and a correction operation (observation update) are performed on the basis of the theory of Kalman filter to estimate a moving object state "X".

In this embodiment, the moving object state "X" includes at least the position of the moving object. In the prediction operation, for example, an operation of predicting the state "X" at the present time (at this time) from a corrected state value "X+" at the one-before time (previous time) using the INS measurement result input from the INS unit 5 as a control input "U" is performed to calculate a predicted state value "X−".

In the correction operation, for example, an operation of correcting the predicted state value "X−" calculated in the prediction operation using the GPS measurement result input from the GPS unit 3 as an observable "Z" is performed to calculate a corrected state value "X+". The calculated corrected state value "X+" is output as the coupling result.

The Kalman filtering unit 9A is configured to apply a constraint condition based on a movement model of a moving object as the observable "Z" independently of the GPS measurement result. In this embodiment, it is assumed that two types of velocity constraint conditions of a "stopping velocity constraint condition" which is a velocity constraint condition when the moving object stops and a "moving velocity constraint condition" which is a velocity constraint condition when the moving object moves are applied.

The stopping velocity constraint condition (first constraint condition) is a constraint condition which can be applied when a moving object stops. When a moving object stops, the velocity of the moving object is ideally zero. Therefore, when it is determined that the moving object stops, the "velocity component of a moving object for each axis=0 (velocity vector=zero vector)" can be given as the observable "Z".

The moving velocity constraint condition (second constraint condition) is a constraint condition which can be applied when a moving object moves. For example, when a four-wheeled automobile is assumed as the moving object, it can be generally assumed that the four-wheeled automobile does not jump nor slides laterally. Therefore, when it is determined that a moving object moves, the "velocity component of a moving object for each of vertical and lateral directions=0" can be given as the observable "Z".

In this embodiment, a case in which the GPS measurement result and the constraint condition (the stopping velocity constraint condition or the moving velocity constraint condition) are switched and used as the observable "Z" is described as an example. Unlike in this embodiment, the GPS measurement result and the constraint condition may be used together as the observable "Z".

FIG. 3 is a diagram illustrating input and output data in the Kalman filtering process. In the drawing, a table representing correlations of a control input "U", an observable "Z", and a state "X" is shown. There are various coupling methods. Among these, a method called loose coupling (sparse coupling) and a method called tight coupling (dense coupling) are generally used.

The loose coupling method is a coupling method in which the coupling of the GPS and the INS is relatively weak. In this method, for example, the coupling process is performed using the INS operation result (such as a position, a velocity, and a posture angle) as the control input "U" and using the GPS operation result (such as a position and a velocity) as the observable "Z". Moving object information (such as a position, a velocity, and a posture angle) is estimated as the state "X" can be used.

The tight coupling method is a coupling method in which the coupling of the GPS and the INS is relatively strong. In this method, for example, the coupling process is performed using the INS operation result (such as a position, a velocity, and a posture angle) as the control input "U" and using the GPS measurement information (such as a code phase, a Doppler frequency, a pseudo-distance, and a pseudo-distance variation) as the observable "Z". The moving object information (such as a position, a velocity, and a posture angle) is estimated as the state "X".

As the tight coupling method, a technique using the INS measurement information (such as an acceleration and an angular velocity) as the control input "U", using the GPS measurement information (such as a code phase, a Doppler frequency, a pseudo-distance, and a pseudo-distance variation) as the observable "Z", and using the moving object information (such as a position, a velocity, and a posture angle) as the state "X" can be used.

The position calculating method according to this embodiment can be substantially similarly applied to any coupling method described above. That is, the GPS measurement information or the GPS operation result may be applied as the GPS measurement result (first measurement result). The INS measurement information or the INS operation result may be applied as the INS measurement result (second measurement result).

Information used as the INS measurement result and the GPS measurement result can be appropriately set depending on a system to be applied. In this case, the operation expressions or the parameter values used in the prediction operation and the correction operation of the Kalman filtering process can be appropriately set depending on the system to be applied. The specific operation expressions or parameter values can be defined on the basis of known techniques and thus will not be described herein.

1-2. Setting of GPS Influence Mode

In this embodiment, approximately two GPS influence mode setting methods will be described. The first setting method is a method of determining position calculation accuracy on the basis of the elapsed time or the position calculation frequency after a moving object starts to move and setting the GPS influence mode on the basis of the position calculation accuracy. The second setting method is a method of determining position calculation accuracy on the basis of a estimated coupling error estimated by performing a predetermined error estimating operation in the coupling process and setting the GPS influence mode on the basis of the position calculation accuracy.

(1) First Setting Method

Figure 4:
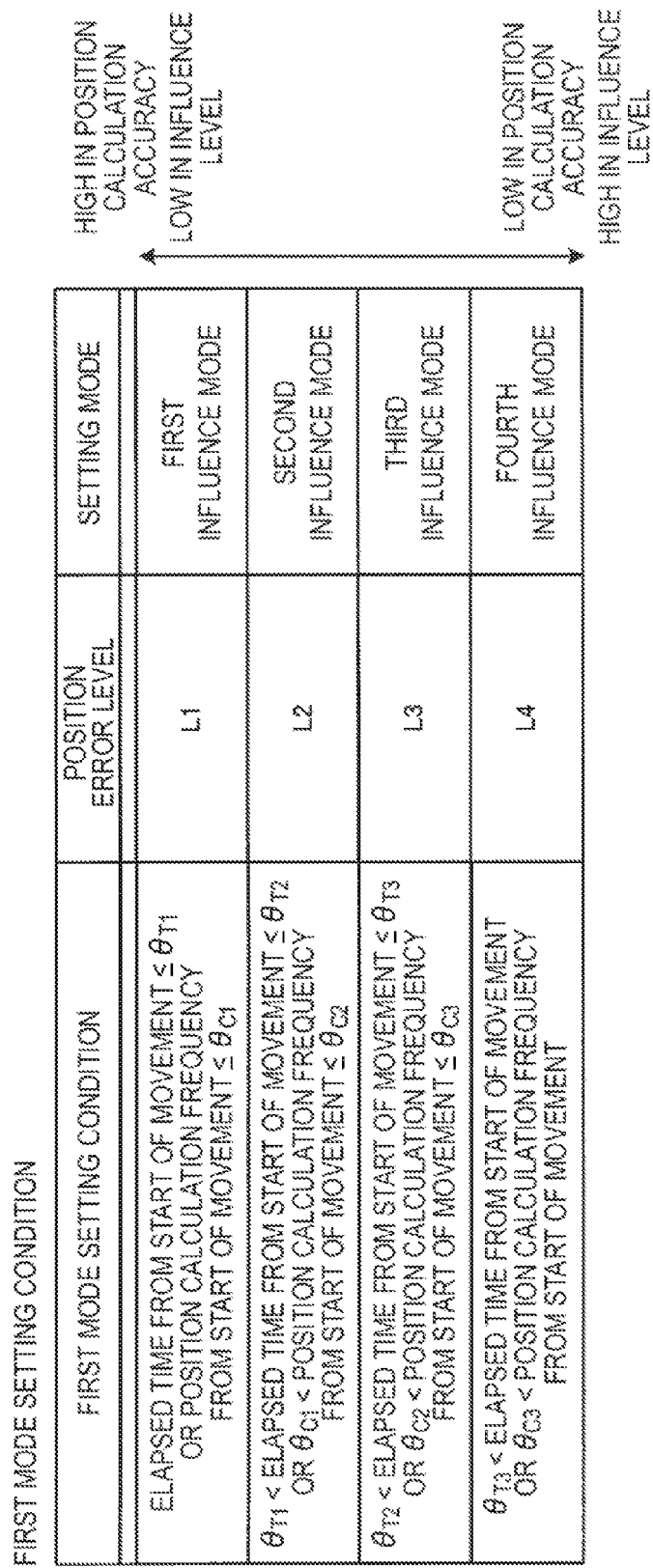
FIG. 4 is a diagram illustrating a first mode setting condition.

FIG. 4 is a diagram illustrating the first setting method of the GPS influence mode and shows a first mode setting condition table in which first mode setting conditions to be used to set the GPS influence mode are determined. In the first mode setting condition table, first mode setting conditions, position error levels, and setting modes are correlated with each other.

As the first mode setting conditions, conditions based on the elapsed time (hereinafter, referred to as "elapsed time from start of movement") after a moving object starts to move or the position calculation frequency (hereinafter, referred to as "position calculation frequency from start of movement") after the moving object starts to move are determined. "From start of movement" means after a moving object starts to move from a stopping state.

The first condition is "elapsed time from start of movement≤first threshold time $\theta_{T1}$ or position calculation frequency from start of movement≤first threshold frequency $\theta_{C1}$", the position error level is "L1", and the setting mode is a "first influence mode". The second condition is "first threshold time $\theta_{T1}$<elapsed time from start of movement≤second threshold time $\theta_{T2}$ or first threshold frequency $\theta_{C1}$<position calculation frequency from start of movement≤second threshold frequency $\theta_{C2}$", the position error level is "L2", and the setting mode is a "second influence mode".

The third condition is "second threshold time $\theta_{T2}$<elapsed time from start of movement≤third threshold time $\theta_{T3}$ or second threshold frequency $\theta_{C2}$<position calculation frequency from start of movement≤third threshold frequency $\theta_{C3}$", the position error level is "L3", and the setting mode is a "third influence mode". The fourth condition is "third threshold time $\theta_{T3}$<elapsed time from start of movement or third threshold frequency $\theta_{C3}$<position calculation frequency from start of movement", the position error level is "L4", and the setting mode is a "fourth influence mode".

The position error level is a level representing the position calculation accuracy, and the higher the level is, the larger the position error is and the lower the position calculation accuracy is. The larger number the setting mode has, the higher the GPS influence level is.

The first to third threshold times "$\theta_{T1}$, $\theta_{T2}$, and $\theta_{T3}$" and the first to third threshold frequencies "$\theta_{C1}$, $\theta_{C2}$, and $\theta_{C3}$" can be appropriately set depending on a system to which the position calculating method according to this embodiment is applied. For example, when the position calculating method is applied to a system that performs the position calculation at "intervals of one second", the values such as in a range of "$\theta_{T1}$=60 seconds, $\theta_{T2}$=90 seconds, and $\theta_{T3}$=120 seconds" or "$\theta_{C1}$=50 times, $\theta_{C2}$=100 times, and $\theta_{C3}$=150 times" can be set.

When a moving object stops, it is possible to reduce the error of position calculation by using a stopping velocity constraint condition. When movement starts in a state where an error is reduced, a state in which the position calculation accuracy is high is maintained for a moment. However, in the inertial navigation operation, an acceleration (acceleration vector) is integrated to calculate a velocity (velocity vector), the velocity (velocity vector) is integrated to calculate a distance and a moving direction, the calculated distance is added to the previous position to calculate the position. That is, since the position is cumulatively calculated by performing multiple integrating operations, the error is accumulated with the lapse of time. Accordingly, when the elapsed time from start of movement increases, the position calculation accuracy is lowered.

Therefore, in the first setting method, it is determined that as the elapsed time from start of movement increases or the position calculation frequency from start of movement increases, the position error level becomes higher (the position calculation accuracy becomes lower). As the position error level increases, the GPS influence level is set to be higher so as to cause the GPS measurement result to strongly influence the INS measurement result.

The first setting method is a setting method suitable for an environment (for example, inner-city area) in which a moving object frequently repeats stopping and moving. In an inner-city area, since there are a lot of traffic lights, an automobile frequently repeats stopping and moving. Since roads are formed in a web-like pattern, the moving direction of an automobile frequently varies. Since an error is likely to occur in the inertial navigation operation in this environment, it is possible to suppress accumulation of errors by changing the GPS influence level with the lapse of time from start of movement.

(2) Second Setting Method

Figure 5:
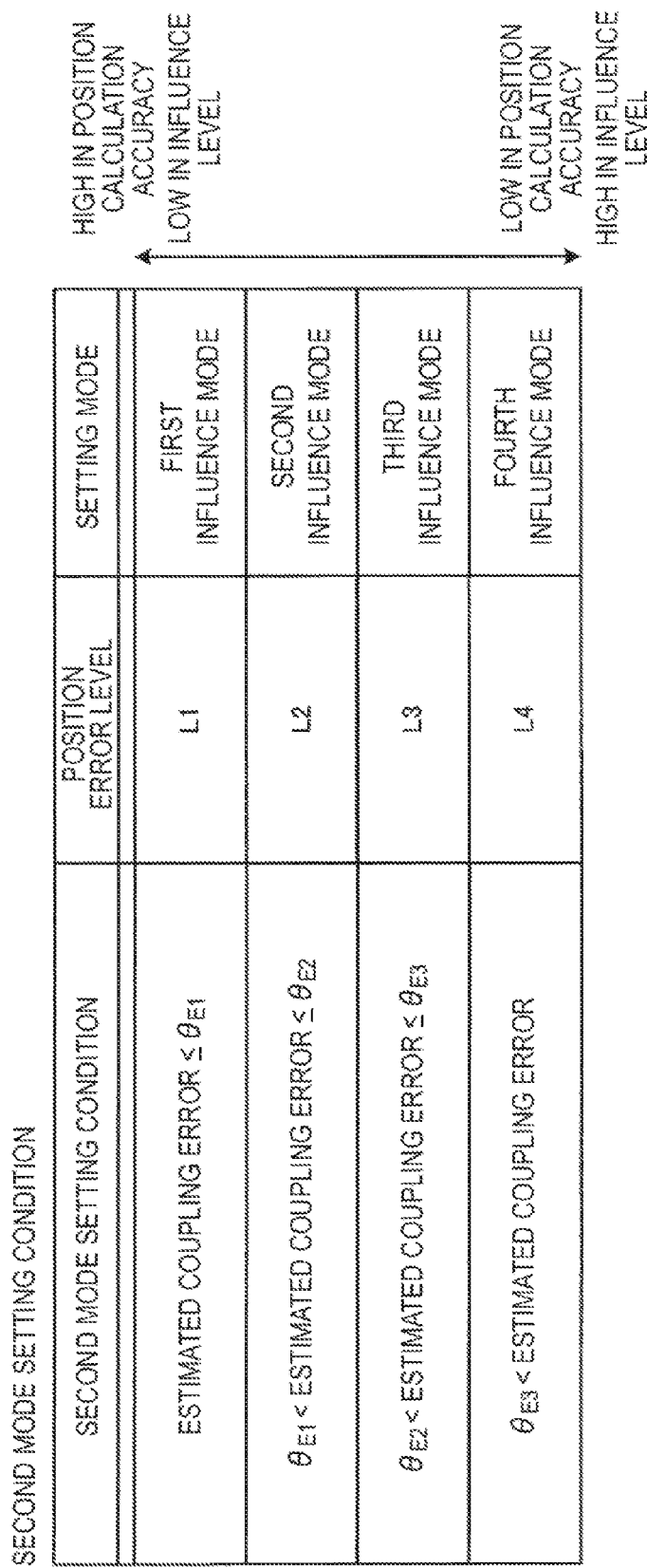
FIG. 5 is a diagram illustrating a second mode setting condition.

FIG. 5 is a diagram illustrating the second setting method of the GPS influence mode and shows a second mode setting condition table in which second mode setting conditions to be used to set the GPS influence mode are determined. In the second mode setting condition table, second mode setting conditions, position error levels, and setting modes are correlated with each other. The position error levels and the setting modes are the same as in the first mode setting condition table shown in FIG. 4.

The second mode setting conditions are defined on the basis of the estimated coupling error. The estimated coupling error is an estimated error value which can be included in the coupling result and is estimated by performing a predetermined error estimating operation in the coupling process. For example, in the Kalman filtering process, an error "P" of the state "X" to be estimated is set to perform an operation. By predicting and correcting the error "P" along with the state "X" in the prediction operation and the correction operation, the estimated coupling error is determined.

When the state "X" includes plural elements, the error "P" can be expressed by an error covariance matrix "P" in the form of matrix. In this case, the error of each element can be estimated from the diagonal components of the error covariance matrix "P". For example, when the elements of the state "X" include the position, the velocity, and the posture angle of a moving object, the diagonal components of the error covariance matrix "P" include an estimated coupling position error, an estimated coupling velocity error, and an estimated coupling posture angle error.

The first condition is "estimated coupling error≤first threshold error $\theta_{E1}$", the position error level is "L1", and the setting mode is a "first influence mode". The second condition is "first threshold error $\theta_{E1}$<estimated coupling error≤second threshold error $\theta_{E2}$", the position error level is "L2", and the setting mode is a "second influence mode".

The third condition is "second threshold error $\theta_{E2}$<estimated coupling Error≤third threshold error $\theta_{E3}$", the position error level is "L3", and the setting mode is a "third influence mode". The fourth condition is "third threshold error $\theta_{E3}$<estimated coupling error", the position error level is "L4", and the setting mode is a "fourth influence mode".

In this case, threshold values of the estimated coupling position error, the estimated coupling velocity error, and the estimated coupling posture angle error are determined in advance. For example, "10 [m]", "1 [m/s]", and "1[°]" are determined as the threshold values corresponding to the first threshold error $\theta_{E1}$, and "20 [m]", "2 [m/s]", and "2[°]" are determined as the threshold values corresponding to the second threshold error $\theta_{E2}$, "30 [m]", "3 [m/s]", and "3 [°]" are determined as the threshold values corresponding to the third threshold error $\theta_{E3}$. The threshold determination is performed on the estimated coupling position error, the estimated coupling velocity error, and the estimated coupling posture angle error and an AND condition or an OR condition is applied thereto to determine the position error level.

It is thought that when the estimated coupling error is small, the position calculation accuracy is high. Accordingly, even by lowering the GPS influence level, the accuracy of position calculation is guaranteed to a certain extent. However, it is thought that when the estimated coupling error is large, the position calculation accuracy is low. Accordingly, the position calculation accuracy can be improved by only raising the GPS influence level.

Therefore, it is determined that as the estimated coupling error becomes larger, the position error level becomes higher (the position calculation accuracy becomes lower). As the position error level becomes higher, the GPS influence level is set to be higher so as to cause the GPS measurement result to strongly influence the INS measurement result.

The second setting method is a setting method suitable for an environment (for example, an open-sky environment) in which GPS satellite signals with high quality can be continuously received. In the open-sky environment, since the GPS measurement information or the GPS operation result can be acquired with high accuracy, the position calculation accuracy is improved by performing the coupling process to the INS measurement result. Therefore, it is likely to lower the GPS influence level and it is thus easy to realize the position calculation with the INS emphasized.

1-3. Operation Setting

The coupling unit 9 performs the coupling process while changing the operation setting depending on the GPS influence mode. In this embodiment, the operation setting includes a GPS measurement result utilization frequency and an error parameter value used in the Kalman filtering process.

The GPS measurement result utilization frequency is an execution frequency of performing the coupling process by utilizing the GPS measurement result. In FIG. 2, the frequency by which the Kalman filtering unit 9A performs the correction operation by utilizing the GPS measurement result as the observable "Z" corresponds to the GPS measurement result utilization frequency.

In a mode in which the GPS influence level is high, the GPS measurement result needs to strongly influence the INS measurement result. On the contrary, in a mode in which the GPS influence level is low, the GPS measurement result needs to weakly influence the INS measurement result. Therefore, in the mode with a lower GPS influence level, the GPS measurement result utilization frequency is set to a lower frequency.

The error parameter value is a kind of parameter value which is set in the Kalman filtering operation. In this embodiment, an observation error (observation noise) "R" corresponding to the error of the observable "Z" is described as an example of the error parameter.

In the correction operation of the Kalman filtering process, when the observation error "R" is set to be small, the state "X" is corrected to follow the observable "Z". That is, the filter functions to estimate the state "X" with the observable "Z" trusted and emphasized. On the contrary, when the observation error "R" is set to be large, the state "X" is corrected to follow the predicted state value "X−". That is, a filter functions to estimate the state "X" with the predicted state value "X−", which has been predicted in the prediction operation, trusted and emphasized.

Therefore, in a mode with a lower GPS influence level, the observation error (R value) is set to a larger value so as to cause the GPS measurement result to weakly influence the INS measurement result.

1-4. Experiment Result

Results of an experiment in which the position calculating process was actually carried out will be described below. An experiment in which a moving object was caused to move along a predetermined path and positions calculated at this time were plotted on a two-dimensional plane of north, south, east, and west was carried out. The first mode setting conditions shown in FIG. 4 were applied and the GPS influence mode was set on the basis of the elapsed time from start of movement. The threshold values of the elapsed time from start of movement used in the experiment were "$\theta_{T1}$=60 seconds, $\theta_{T2}$=90 seconds, and $\theta_{T3}$=120 seconds". In the drawings, the horizontal axis represents the east-west direction and the vertical axis represents the north-south direction. The unit is meter [m]. A position of "0 m" in the east-west direction and "0 m" in the north-south direction was set as a start point and a moving object was caused to travel along a path circulating in a clockwise direction from the start point to the west. A goal point was set to a predetermined position in the vicinity of the start point.

Figure 6:
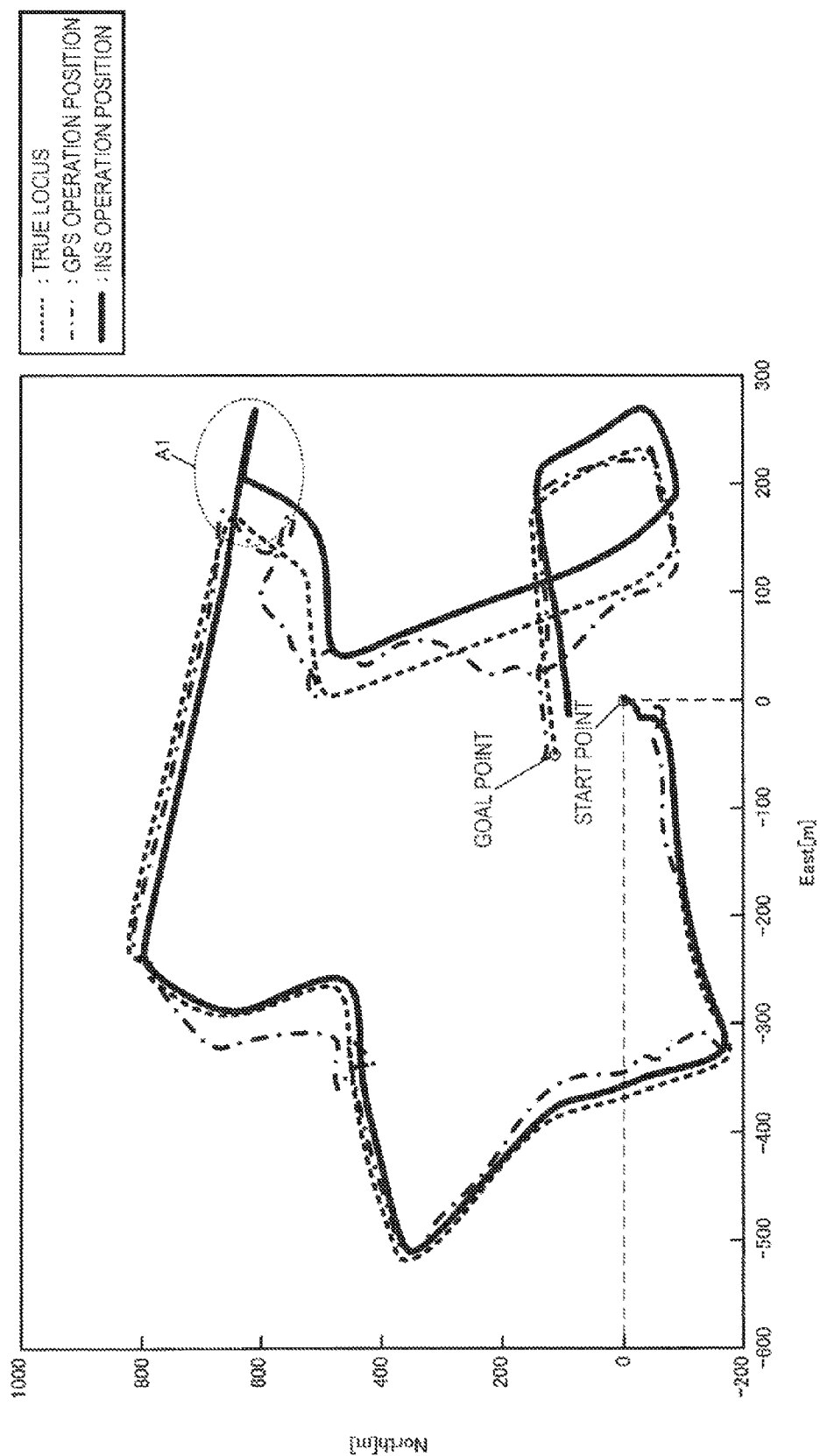
FIG. 6 is a diagram illustrating an example of an experiment result of position calculation.

FIG. 6 is a diagram illustrating an experiment result using the position calculating method according to the related art. In this experiment, the coupling process of coupling the GPS and the INS is not performed. In FIG. 6, the true locus of a moving object is indicated by a "dotted line", the locus of the GPS operation position is indicated by a "one-dot chained line", and the locus of the INS operation position is indicated by a "solid line".

From this experiment result, it can be seen that the locus of the INS operation position along the true locus is obtained for an initial time but the error of the INS operation position increases with the lapse of long time. Particularly, paying attention to area A1 surrounded with a dotted line, the INS operation position does not turn at a position at which the INS operation position should originally turn to right and passes through the position. Thereafter, the INS position returns along the passed route and turns at a position slightly spaced apart from the position at which the INS operation position should originally turn. Accordingly, the error corresponding to the distance overlaps as a position error.

Figure 7:
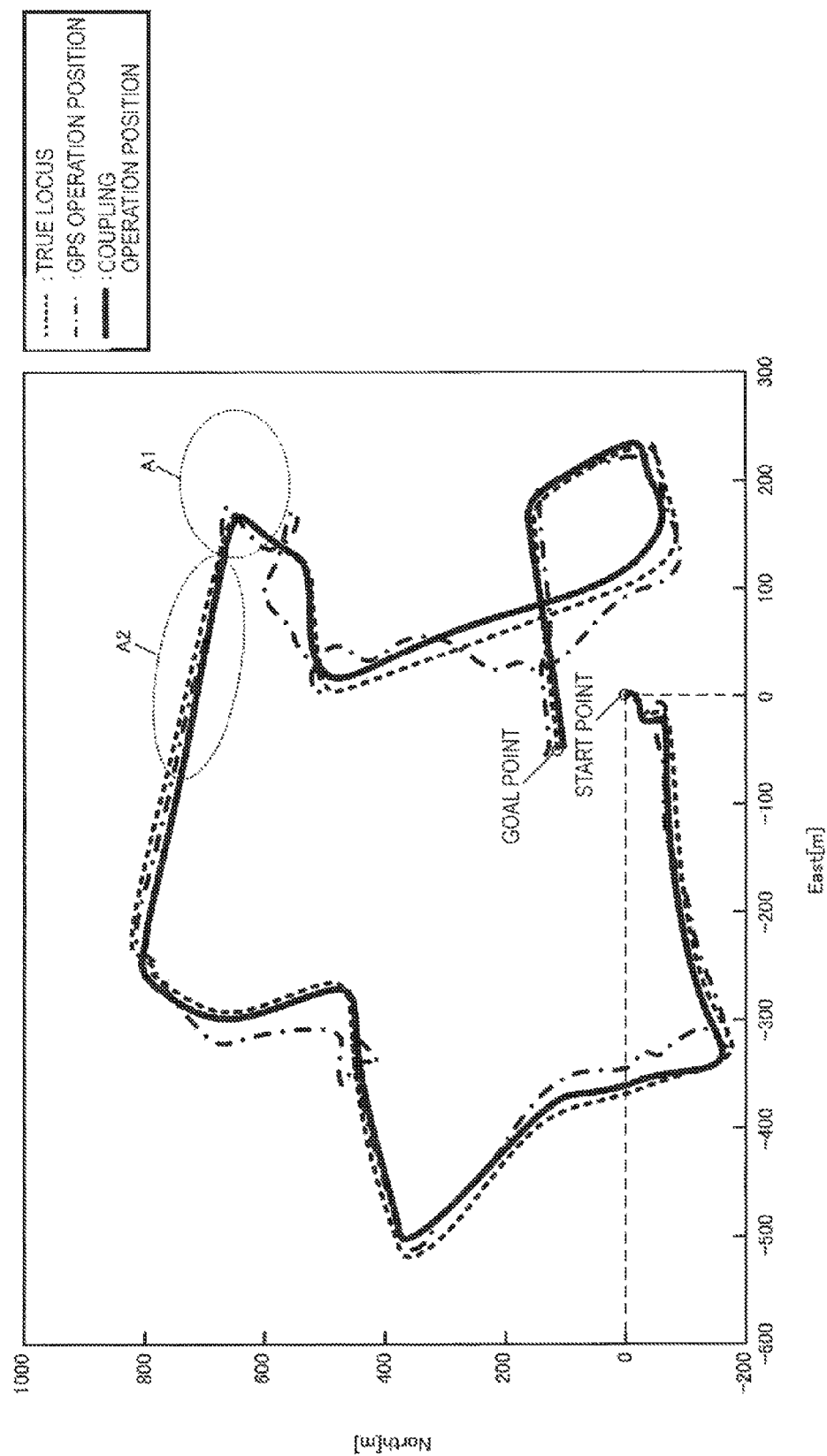
FIG. 7 is a diagram illustrating an example of an experiment result of position calculation.

FIG. 7 is a diagram illustrating an experiment result using the position calculating method according to this embodiment. In this experiment, the coupling process of coupling the GPS and the INS is performed. In FIG. 7, the true locus of a moving object is indicated by a "dotted line", the locus of the GPS operation position is indicated by a "one-dot chained line", and the locus of the coupling operation position is indicated by a "solid line".

From this experiment result, it can be seen that good results are obtained without increasing the position error even with the lapse of long time. The problem with passing in area A1 is solved. Paying attention to an area in the front stage of area A1, the GPS influence mode is changed from the "second influence mode" to the "third influence mode" in area A2. That is, in the area, the GPS influence mode is changed to a mode with a higher GPS influence level. As a result, it can be seen that the locus is attracted to the locus of the GPS operation position and the locus of the coupling operation position slowly gets closer to the true locus.

2. Example

An example of an electronic apparatus including the position calculating device will be described below. Herein, an example of a navigation apparatus including a position calculating device will be described. Here, the example of the invention is not limited to the following example.

2-1. System Configuration

Figure 8:
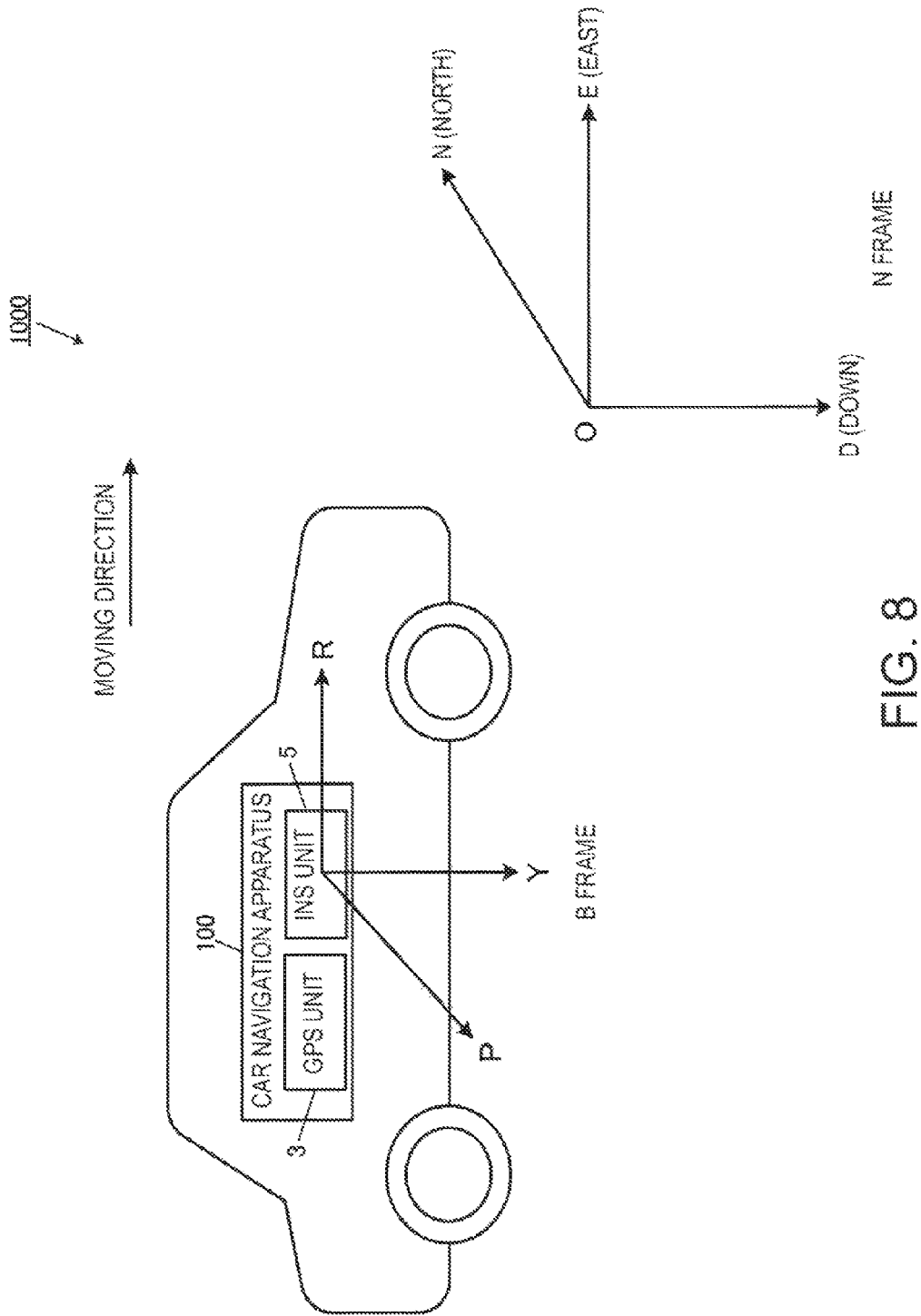
FIG. 8 is a diagram illustrating a system configuration of a navigation system.

FIG. 8 is a diagram illustrating a system configuration of a navigation system 1000 according to this example. The navigation system 1000 is a system in which a car navigation apparatus 100 as a kind of electronic apparatus including a position calculating device is installed in a four-wheeled automobile (hereinafter, simply referred to as "automobile") as a kind of moving object.

The car navigation apparatus 100 is an electronic apparatus that is installed in an automobile so as to provide a driver of the automobile with navigation guidance. The car navigation apparatus 100 includes a GPS unit 3 and an INS unit 5.

In this example, the GPS unit 3 measures and outputs GPS measurement information 55. The INS unit 5 measures and outputs INS measurement information 56 in a B frame known as a body frame. The B frame is a three-dimensional orthogonal coordinate system in which the front-rear direction with the front side of a moving object as positive is set as an R axis (roll axis), the left-right direction with the right side as positive is set as a P axis (pitch axis), and the up-down direction with the vertically-downward direction as positive is set as a Y axis (yaw axis).

The car navigation apparatus 100 performs a GPS operation process using the GPS measurement information acquired from the GPS unit 3 and performs an INS operation process using the INS measurement information acquired from the INS unit 5. The coupling process is performed on the operation results to calculate the position of the automobile and a navigation screen in which the calculated position is plotted is displayed on a display as a display unit 30.

The position of the automobile is calculated in an N frame which is an absolute coordinate system in which the moving space of the automobile is defined, The N frame is defined, for example, as an NED coordinate system known as a northeast-down coordinate system or an ECEF coordinate system known as an earth-centered earth-fixed coordinate system.

2-2. Functional Configuration

Figure 9:
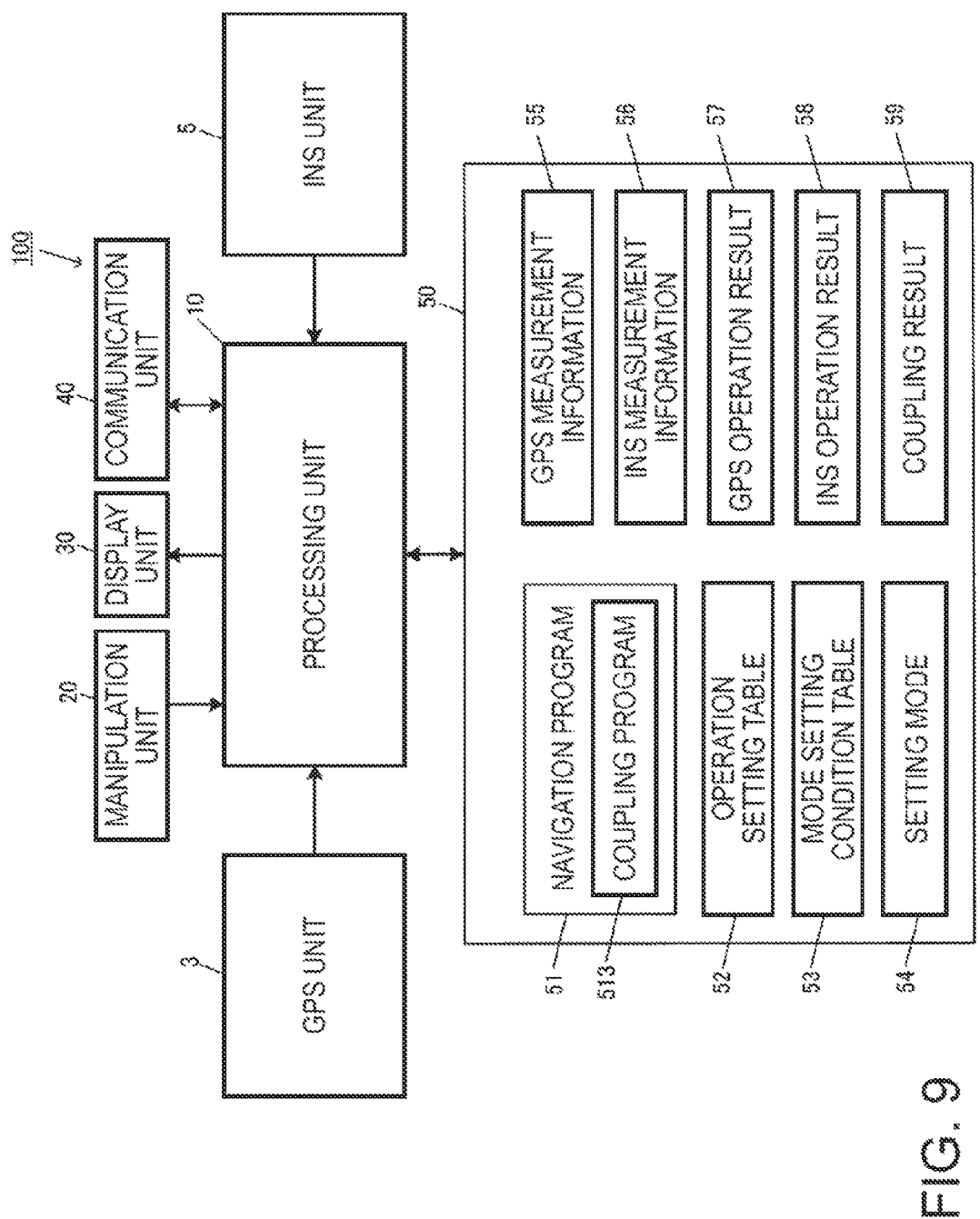
FIG. 9 is a block diagram illustrating a functional configuration of a car navigation apparatus.

FIG. 9 is a block diagram illustrating an example of a functional configuration of the car navigation apparatus 100. The car navigation apparatus 100 includes the GPS unit 3, the INS unit 5, a processing unit 10, a manipulation unit 20, a display unit 30, a communication unit 40, and a storage unit 50.

The processing unit 10 is a control device that comprehensively controls the units of the car navigation apparatus 100 in accordance with various programs such as a system program stored in the storage unit 50 and includes a processor such as a CPU (Central Processing Unit). The processing unit 10 performs a navigation process in accordance with a navigation program 51 stored in the storage unit 50 and performs a process of displaying a map with a current position of an automobile marked thereon on the display unit 30.

The manipulation unit 20 is an input device including, for example, a touch panel or button switches, and outputs the signal of the pressed key or button to the processing unit 10. Various instruction inputs such as an input of a destination are performed by manipulating the manipulation unit 20.

The display unit 30 is a display device that includes an LCD (Liquid Crystal Display) or the like and that performs various displays based on a display signal input from the processing unit 10. The navigation screen or the like is displayed on the display unit 30.

The communication unit 40 is a communication device that transmits and receives information used in the apparatus to and from the outside through communication networks such as the Internet under the control of the processing unit 10. Known wireless communication techniques can be used in the communications.

The storage unit 50 is constructed by a storage device such as a ROM (Read Only Memory), a flash ROM, and a RAM (Random Access Memory), and stores a system program of the car navigation apparatus 100, various programs for realizing various functions such as a navigation function, data, and the like. The storage unit has a work area temporarily storing data in process of various processes and process results thereof.

In the storage unit 50, a navigation program 51 which is read by the processing unit 10 and which is executed as a navigation process (see FIG. 11) is stored as the program. The navigation program 51 includes a coupling program 513 which is executed as the coupling process (see FIG. 12) as a sub routine.

The storage unit 50 stores as the data an operation setting table 52, a mode setting condition table 53, a setting mode 54, GPS measurement information 55, INS measurement information 56, a GPS operation result 57, an INS operation result 58, and a coupling result 59.

The operation setting table 52 is a table in which the operation setting in the coupling process is defined and a configuration example of the table is shown in FIG. 10. In the operation setting table 52, the GPS influence mode 521 and the operation setting 523 are stored in correlation with each other.

Regarding the GPS measurement result utilization frequency, "not utilized" is determined for the first influence mode, and "once of ten times" is determined for the second influence mode. "Once of five times" is determined for the third influence mode and "every time" is determined for the fourth influence mode. That is, as the GPS influence level becomes lower, the GPS measurement result utilization frequency is set to a lower frequency.

The observation error (R value) of the Kalman filtering process includes a position observation error "$R_p$" which is an observation error of a position and a velocity observation error "$R_V$" which is an observation error of a velocity. Since the first influence mode does not utilize the GPS measurement result, the observation error is set to "– (none)". "$R_P$=500 and $R_V$=50" are determined for the second influence mode, "$R_P=100$ and $R_V=10$" are determined for the third influence mode, and "$R_P=(\sigma_P)^2$ and $R_V=(\sigma_V)^2$" are determined for the fourth influence mode.

"$\sigma_P$" and "$\sigma_V$" represent the position error and the velocity error included in the GPS operation result, respectively. According to the experiment performed by the inventor of the invention, the position error and the velocity error are calculated as values of about "$\sigma_P=3$ to 4 [m]" and "$\sigma_V=0.6$ to 0.8 [m/s]", respectively, under general positioning environments. Accordingly, in the fourth influence mode, the value of about "10" is set as the position observation error "$R_P$" and the value of about "0.5" is set as the velocity observation error "$R_V$". As a result, as the GPS influence level becomes lower, the observation error "R" is set to a larger value.

The mode setting condition table 53 is a table in which conditions for setting the GPS influence mode are determined and includes, for example, the first mode setting condition table or the second mode setting condition table (see FIGS. 4 and 5).

Figure 11:
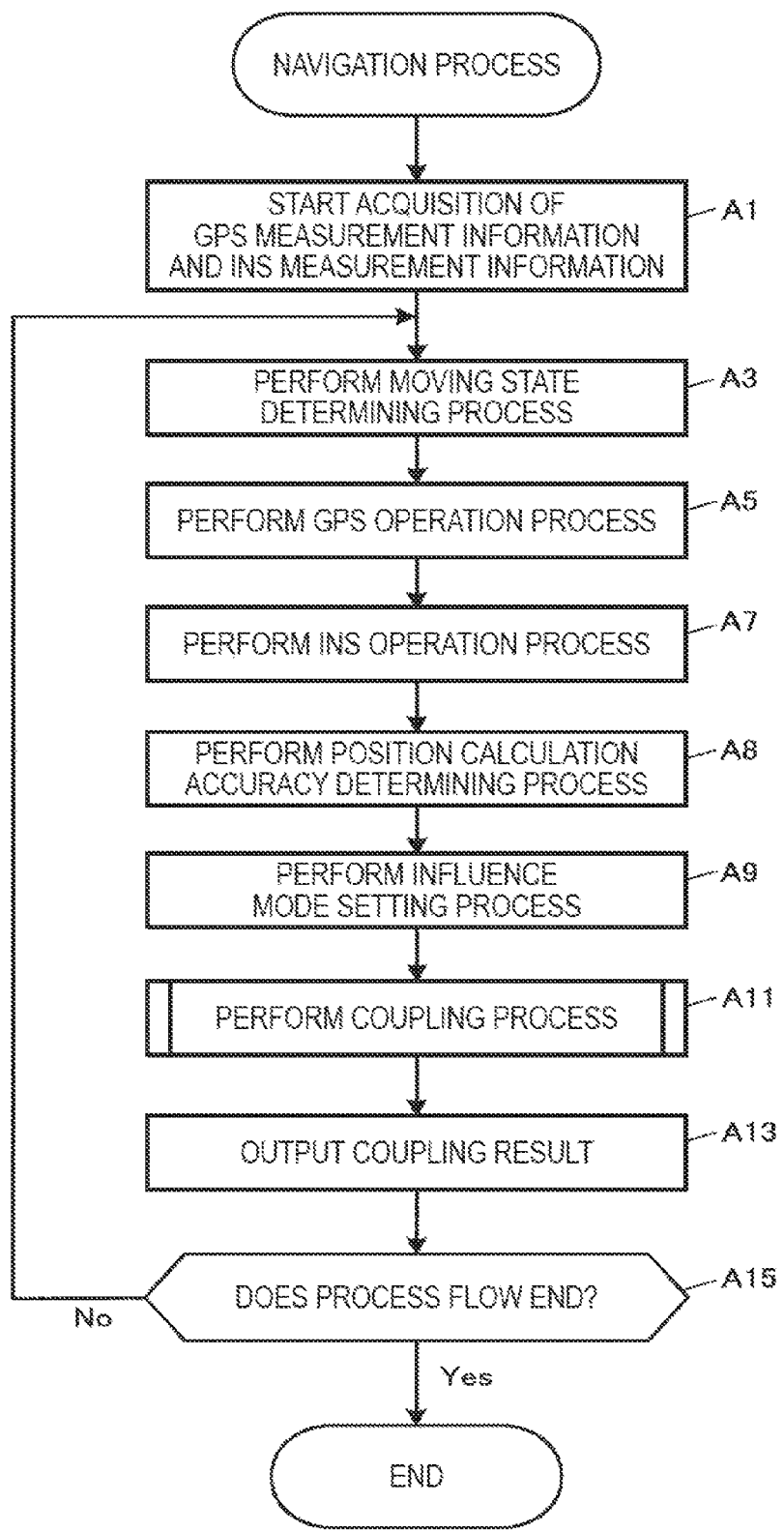
FIG. 11 is a flowchart illustrating the flow of a navigation process.

The setting mode 54 is a preset GPS influence mode and is frequently updated through the influence mode setting process 2-3. Process Flow FIG. 11 is a flowchart illustrating a process flow of a navigation process which is performed in accordance with the navigation program 51 stored in the storage unit 50 by the processing unit 10.

First, the processing unit 10 starts acquisition of the GPS measurement information 55 and the INS measurement information 56 from the GPS unit 3 and the INS unit 5 (step A1). Then, the processing unit 10 performs a moving state determining process (step A3). Specifically, the processing unit determines whether the automobile stops or moves, for example, on the basis of the acceleration (acceleration vector) or the angular velocity of the automobile acquired as the INS measurement information 56 acquired from the INS unit 5.

Thereafter, the processing unit 10 performs a GPS operation process (step A5). Specifically, the processing unit calculates the position or the velocity (velocity vector) of the automobile by performing a known positioning calculation using the GPS measurement information 55 acquired from the GPS unit 3. The processing unit estimates errors of the position and the velocity (velocity vector) by performing a known error estimating operation. The operation results are stored as the GPS operation result 57 in the storage unit 50.

The processing unit 10 performs an INS operation process (step A7). Specifically, the processing unit calculates the position, the velocity (velocity vector), the posture angle of the automobile by performing a known inertial navigation operation using the INS measurement information 56 acquired from the INS unit 5. Then, the operation result is stored as the INS operation result 58 in the storage unit 50.

Thereafter, the processing unit 10 performs a position calculation accuracy determining process (step A8). Specifically, the position error level representing the position calculation accuracy is determined on the basis of the elapsed time from start of movement, the position calculation frequency after start of movement, or the estimated coupling error with reference to the mode setting condition table 53 stored in the storage unit 50.

Subsequently, the processing unit 10 performs an influence mode setting process (step A9). Specifically, the setting mode 54 in the storage unit 50 is updated to the setting mode correlated with the position error level determined in step A8 with reference to the mode setting condition table 53 stored in the storage unit 50.

Thereafter, the processing unit 10 performs the coupling process in accordance with the coupling program 513 stored in the storage unit 50 (step A11).

Figure 12:
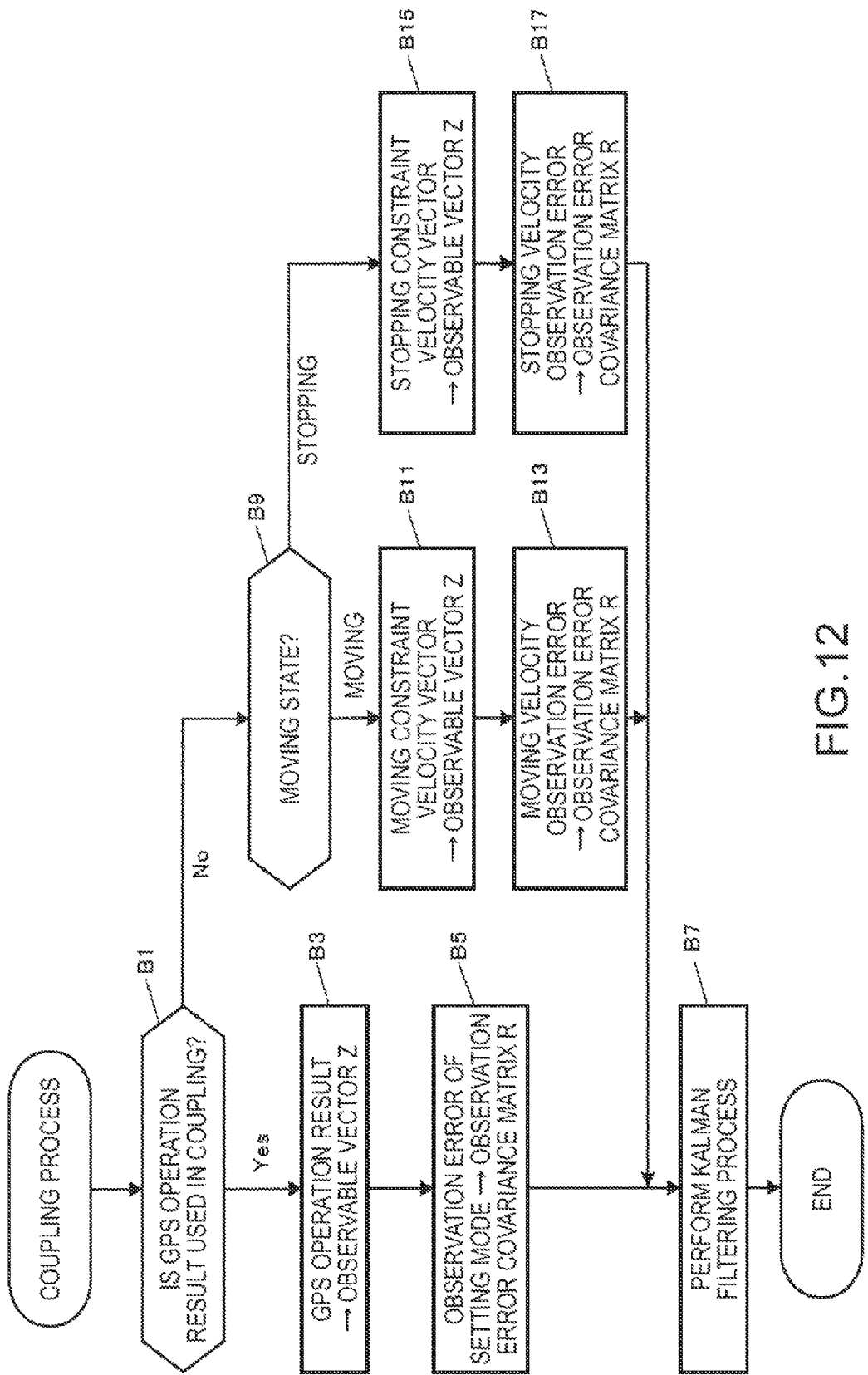
FIG. 12 is a flowchart illustrating the flow of a coupling process.

FIG. 12 is a flowchart illustrating the process flow of the coupling process.

The processing unit 10 determines whether the GPS operation result 57 should be utilized in the coupling process (step B1). Specifically, the processing unit determines whether the GPS operation result 57 should be utilized in this coupling process on the basis of the GPS measurement result utilization frequency correlated with the GPS influence mode set in the influence mode setting process.

When it is determined that the GPS operation result 57 is utilized in the coupling process (YES in step B1), the processing unit 10 sets an observable vector "Z" with the newest GPS operation result 57 as the observable (step B3). The processing unit sets an observation error covariance matrix "R" on the basis of the observation error corresponding to the current setting mode 54 with reference to the operation setting table 52 (step B5). Then, the processing unit 10 performs the Kalman filtering process using the observable vector "Z" and the observation error covariance matrix "R" set in steps B3 and B5 (step B7).

On the other hand, when it is determined in step B1 that the GPS operation result 57 is not utilized in the coupling process (NO in step B1), the processing unit 10 determines the moving state determined in step A3 (step B9). When the moving state is "moving" (moving in step B9), the processing unit 10 sets a moving constraint velocity vector as the observable vector "Z" (step B11). The processing unit sets the observation error covariance matrix "R" on the basis of a moving velocity observation error (for example, a predetermined value) (step B13). Then, the processing unit 10 performs the Kalman filtering process using the observable vector "Z" and the observation error covariance matrix "R" set in steps B11 and B13 (step B7).

When the moving state is "stopping" (stopping in step B9), the processing unit 10 sets a stopping constraint velocity vector as the observable vector "Z" (step B15). The processing unit sets the observation error covariance matrix "R" on the basis of a stopping velocity observation error (for example, a predetermined value) (step B17). Then, the processing unit 10 performs the Kalman filtering process using the observable vector "Z" and the observation error covariance matrix "R" set in steps B15 and B17 (step B7).

When the Kalman filtering process is performed in step B7, the processing unit 10 stores the result as the coupling result 59 in the storage unit 50. Then, the processing unit 10 ends the coupling process.

Referring to the navigation process shown in FIG. 11 again, after performing the coupling process, the processing unit 10 outputs the coupling result 59 (step A13). Then, the processing unit 10 determines whether the process flow should ends (step A15). For example, when a navigation end instructing manipulation is performed by a user through the use of the manipulation unit 20, the processing unit determines that the navigation process ends.

When it is determined that the process flow should not end (NO in step A15), the processing unit 10 returns the process flow to step A3. When it is determined that the process flow should end (YES in step A15), the processing unit 10 ends the navigation process.

3. Operational Advantages

In the position calculating device 1 including the GPS unit 3 and the INS unit 5, the position calculation accuracy determining unit 6 determines the position calculation accuracy. The influence level setting unit 7 sets the influence level of the GPS measurement result on the INS measurement result on the basis of the position calculation accuracy determined by the position calculation accuracy determining unit 6. The coupling unit 9 performs the coupling process of coupling the GPS measurement result and the INS measurement result on the basis of the influence level set by the influence level setting unit 7 to calculate the position of the moving object.

The position calculation accuracy determining unit 6 determines the position calculation accuracy, for example, on the basis of the elapsed time or the position calculation frequency after a moving object starts to move. The position calculation accuracy determining unit 6 determines the position calculation accuracy, for example, on the basis of the estimated coupling error estimated by causing the coupling unit 6 to perform a predetermined error estimating operation.

In the first position calculating device 1A, the influence level setting unit 7 includes an influence mode setting unit 7A and sets the GPS influence mode on the basis of the position error level determined by the position error level determining unit 6A of the position calculation accuracy determining unit 6. Specifically, as the position error level becomes lower (as the position calculation accuracy becomes higher), the GPS influence mode is set to a mode with a lower GPS influence level.

In the first position calculating device 1A, the coupling unit 9 includes the Kalman filtering unit 9A and performs the Kalman filtering process while changing the operation setting on the basis of the GPS influence mode set by the influence mode setting unit 7A. The operation setting includes the frequency of performing the coupling process using the GPS measurement result. A lower frequency is set for an influence mode with a lower GPS influence level. The operation setting includes the observation error (R value) which is the assumed error of the GPS measurement result as the observable. A larger value is set for an influence mode with a lower GPS influence level.

In this way, by changing the influence level of the measurement result of the satellite positioning unit on the measurement result of the inertial positioning unit on the basis of the position calculation accuracy, it is possible to appropriately adjust the influence level, particularly, when the position calculating device continuously operates. By changing the operation setting of the coupling process depending on the appropriately-adjusted influence level, it is possible to enhance effectiveness of the coupling process and thus to improve the accuracy of position calculation.

4. Modified Example

Examples to which the invention can be applied are not limited to the above-mentioned examples, but can be appropriately modified without departing from the concept of the invention. In modified examples described below, the same elements as in the above-mentioned examples will be referenced by the same reference signs, description thereof will not be repeated, and differences from the above-mentioned examples will be mainly described.

4-1. Units

In the above-mentioned embodiment, the GPS unit employing the GPS is exemplified as the satellite positioning unit, but units employing other satellite positioning systems such as WAAS (Wide Area Augmentation System), QZSS (Quasi Zenith Satellite System), GLONASS (GLObal NAvigation Satellite System), and GALILEO may be used.

In the above-mentioned embodiment, the INS unit is exemplified as the inertial positioning unit, but an inertial sensor or an inertial measurement unit (IMU) measuring INS measurement information (acceleration or angular velocity) may be used as the inertial positioning unit. In this case, the processing unit of the position calculating device has only to perform the INS operation process using the INS measurement information measured by the inertial positioning unit.

4-2. Coupling Process

In the above-mentioned embodiment, the Kalman filtering process is exemplified as the coupling process, but the coupling process is not limited thereto. For example, an averaging process of averaging the GPS measurement result and the INS measurement result may be included in the coupling process.

A simple arithmetic average or a geometric average may be used in the averaging operation or a weighted average may be used. When the arithmetic average or the geometric average is used, for example, the frequency of performing the averaging process using the GPS measurement result may be determined as the operation setting of the coupling process. As the GPS influence level becomes higher, the frequency has only to be set to be higher so as to cause the GPS measurement result to strongly influence the INS measurement result.

When the weighted average is used, for example, the weight of the weighted average may be determined as the operation setting of the coupling process. Specifically, in a mode with a higher GPS influence level, the weight of the GPS measurement result has only to be set to a larger value so as to more emphasize the GPS measurement result than the INS measurement result and to weighted-average the GPS measurement result.

4-3. Number of Steps of Influence Modes

In the above-mentioned embodiment, four steps of the first to fourth influence modes are used as the GPS influence mode, but the number of steps of the influence modes may be set appropriately. That is, a smaller number of steps (for example, two steps) or a larger number of steps (for example, eight steps) may be used as the influence modes. This corresponds to more roughly or more finely setting the GPS influence level.

4-4. Processing Entity

In the above-mentioned examples, it is stated that the processing unit 10 of the electronic apparatus performs the GPS operation process using the GPS measurement information 55 acquired from the GPS unit 3 and the processing unit 10 performs the INS operation process using the INS measurement information 56 acquired from the INS unit 5. That is, the processing entity of the GPS operation process, the INS operation process, the coupling process is the processing unit 10 of the electronic apparatus. This configuration may be modified as follows.

The GPS unit 3 performs the GPS operation process using the GPS measurement information 55, obtains the GPS operation result 57, and outputs the GPS operation result to the processing unit 10. The INS unit 5 performs the INS operation process using the INS measurement information 56, obtains the INS operation result 58, and outputs the INS operation result to the processing unit 10. Then, the processing unit 10 performs the coupling process of coupling the GPS operation result 57 and the INS operation result 58 acquired from the units. That is, in this case, the processing entities of the GPS operation process and the INS operation process are the GPS unit 3 and the INS unit 5, and the processing entity of the coupling process is the processing unit 10 of the electronic apparatus.

4-5. Electronic Apparatus

The above-mentioned embodiment discloses an example where the invention is applied to a navigation apparatus mounted on a four-wheeled automobile, but the electronic apparatus to which the invention can be applied is not limited to the example. For example, the invention may be applied to a navigation apparatus mounted on a two-wheeled automobile or may be applied to a portable navigation apparatus.

The invention may be similarly applied to electronic apparatuses other than a navigation apparatus. For example, the invention may be similarly applied to other electronic apparatuses such as a mobile phone, a PC, and a PDA (Personal Digital Assistant) to realize position calculation of the corresponding electronic apparatuses.

The invention claimed is:

1. A position calculating method of calculating a position of a moving object using a first measurement result of a satellite positioning receiver unit disposed in the moving object and a second measurement result of an inertial positioning sensor unit disposed in the moving object, comprising:

determining position calculation accuracy;

comparing the position calculation accuracy to a set of three or more accuracy threshold ranges;

adjusting an influence of the first measurement result of the satellite positioning receiver unit on the second measurement result of the inertial positioning sensor unit to one of three or more influence levels corresponding to the accuracy threshold ranges on the basis of the position calculation accuracy; and calculating the position of the moving object by performing a coupling process of coupling the first measurement result and the second measurement result on the basis of the adjusted influence, wherein adjusting the influence includes performing one of:

setting a frequency of performing the coupling process to be lower with higher position calculation accuracy; and setting an error parameter value used in a Kalman filtering process to be larger with higher position calculation accuracy.

2. The position calculating method according to claim 1, wherein the determining of the position calculation accuracy includes determining the position calculation accuracy on the basis of an elapsed time or a position calculation frequency after the moving object starts to move.

3. The position calculating method according to claim 1, wherein the coupling process includes an error estimating operation of estimating an error included in the calculated position, and wherein the determining of the position calculation accuracy includes determining the position calculation accuracy on the basis of the error estimated through the error estimating operation.

4. The position calculating method according to claim 1, wherein the calculating of the position includes performing the coupling process using the first measurement result on the basis of the frequency.

5. The position calculating method according to claim 1, wherein the calculating of the position includes performing the Kalman filtering process using the first measurement result and the error parameter value.

6. A position calculating device calculating a position of a moving object using a first measurement result of a satellite positioning receiver unit disposed in the moving object and a second measurement result of an inertial positioning sensor unit disposed in the moving object, comprising:

a position calculation accuracy determining unit that determines a position calculation accuracy;

an influence level setting unit that compares the position calculation accuracy to a set of three or more accuracy threshold ranges, and adjusts an influence of the first measurement result of the satellite positioning receiver unit on the second measurement result of the inertial positioning sensor unit to one of three or more influence levels corresponding to the accuracy threshold ranges on the basis of the position calculation accuracy; and a coupling unit that calculates the position of the moving object by performing a coupling process of coupling the first measurement result and the second measurement result on the basis of the adjusted influence, wherein adjusting the influence includes performing one of:

setting a frequency of performing the coupling process to be lower with higher position calculation accuracy; and setting an error parameter value used in a Kalman filtering process to be larger with higher position calculation accuracy.

7. The position calculating method according to claim 1, wherein the accuracy threshold ranges are ranges of elapsed times from start of movement.

8. The position calculating method according to claim 1, wherein the accuracy threshold ranges are ranges of frequencies of position calculation.

* * * * *